PETERS & PAULY.
Plow.
No. 62,881
Patented Mar. 12, 1867.
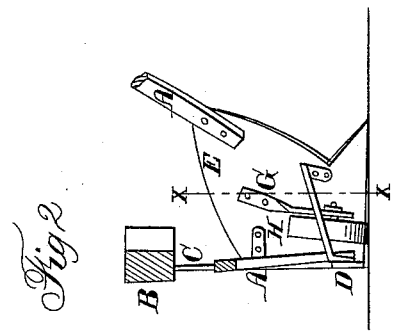
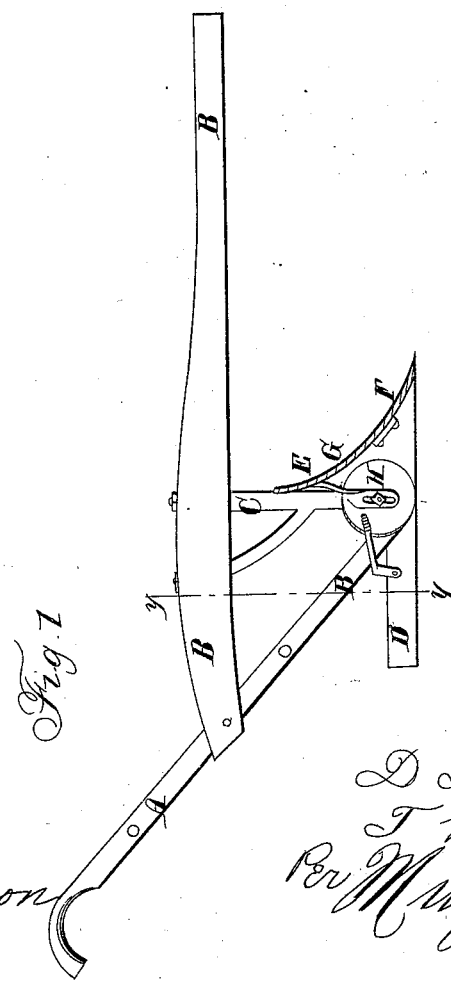
Witnesses:
F. A. Jackson
W. Trewm
Inventor
D. Peters
T. W. Pauly
Per Munn
Attorneys

United States Patent Office.

DANIEL PETERS, AND JOHN W. PAULY, OF KEOKUK, IOWA.

Letters Patent No. 62,881, dated March 12, 1867; antedated March 4, 1867.

IMPROVEMENT IN PLOUGHS.

The Schedule referred to in these Letters Patent and making part of the same.

TO ALL WHOM IT MAY CONCERN:

Be it known that we, D. PETERS, and J. W. PAULY, of Keokuk, in the county of Lee, and State of Iowa, have invented a new and useful Improvement in Plough; and we do hereby declare that the following is a full, clear, and exact description thereof, which will enable others skilled in the art to make and use the same, reference being had to the accompanying drawings, forming part of this specification, in which—

Figure 1 is a vertical longitudinal section of my improved plough, taken through the line $x\ x$, fig. 2.

Figure 2 is a vertical cross-section of the same, taken through the line $y\ y$, fig. 1.

Similar letters of reference indicate like parts.

My invention has for its object to so improve the construction of the plough, that the power necessary to draw it through the ground may be diminished, and the wear upon the land-side and bottom of the plough greatly lessened. And it consists in the combination of a friction-wheel and supporting-bar with the plough, in the manner hereinafter more fully described.

A are the handles; B is the beam; C, the standard; D, the land-side; E, the mould-board; and F, the point of the plough, about the construction of which parts there is nothing new. G is a bar or support, the upper end of which is securely attached to the inner side of the mould-board E, as shown in figs. 1 and 2. The lower end of the bar or support G is slotted, as shown in fig. 1, and projects downward into such a position that the wheel H, which is pivoted to it, may be as nearly as possible beneath the centre of the plough. The end of the axle of the wheel H passes through the slot in and is secured to the bar or support G by a screw-nut, as shown in figs. 1 and 2; which construction enables the wheel H to be adjusted as may be desired. The wheel H should be so set as to take the friction from the bottom and land-side of the plough, and the axle should be slightly inclined, or the face of the wheel slightly bevelled, so that it may have a tendency to draw the plough from the lands, and thus diminish the friction and consequently the amount of power required to draw the said plough.

We claim as new, and desire to secure by Letters Patent—

The combination of the friction-wheel H and adjustable supporting-bar G with the mould-board E of the plough, when said wheel and bar are constructed and arranged substantially as herein shown and described, and for the purpose set forth.

DANIEL PETERS,
JNO. W. PAULY.

Witnesses:
U. RUSSELL,
D. W. FORD.